(No Model.)
A. ENGEL.
FIRE HOSE CONNECTION FOR STAND PIPES.
No. 581,342. Patented Apr. 27, 1897.
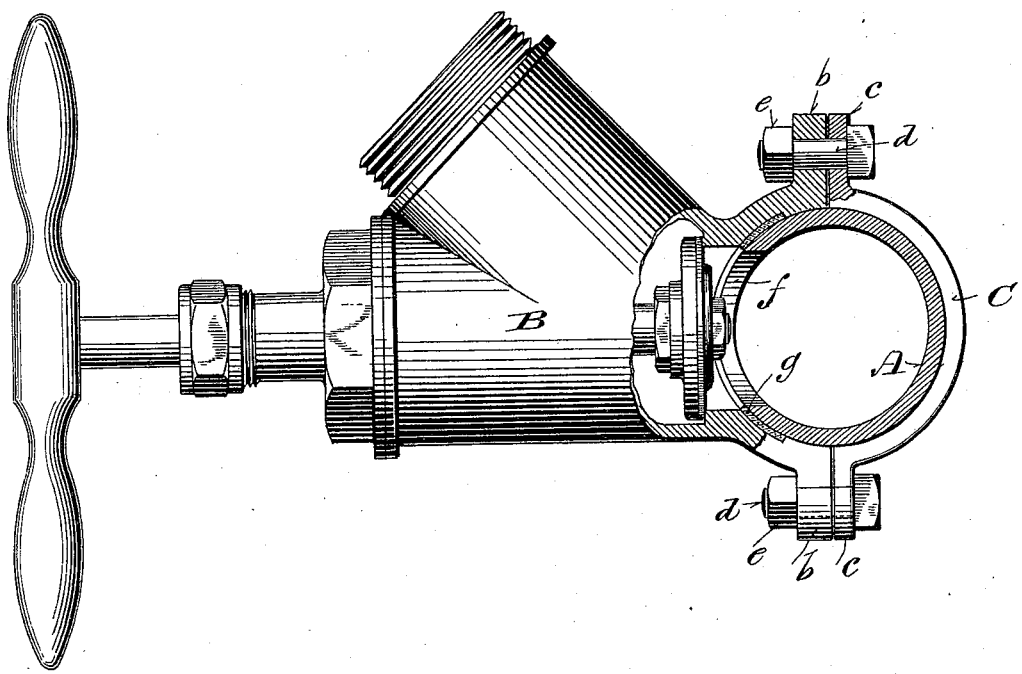
Witnesses
Geo. W. Young,
N. E. Oliphant
Inventor
August Engel.
By H. G. Underwood.
Attorneys

United States Patent Office.

AUGUST ENGEL, OF MILWAUKEE, WISCONSIN, ASSIGNOR TO THE MILWAUKEE BRASS MANUFACTURING COMPANY, OF SAME PLACE.

FIRE-HOSE CONNECTION FOR STAND-PIPES.

SPECIFICATION forming part of Letters Patent No. 581,342, dated April 27, 1897.

Application filed April 16, 1894. Serial No. 507,654. (No model.)

*To all whom it may concern:*

Be it known that I, AUGUST ENGEL, a citizen of the United States, and a resident of Milwaukee, in the county of Milwaukee, and in the State of Wisconsin, have invented certain new and useful Improvements in Fire-Hose Connections for Stand-Pipes; and I do hereby declare that the following is a full, clear, and exact description thereof.

My invention has for its object to cheapen the cost of fire-service stand-pipes attachable to the outside of buildings and provided with hose connections at various heights corresponding to the stories of said buildings.

To this end the invention consists in certain peculiarities of construction and combination of parts pertaining to the hose connections, whereby the latter may be secured in place without any screw-tapping or extra thread-cutting on the pipe-sections; and as an especial advantage of said invention I am able to utilize what is known as "random" pipe, no measurements of the buildings being necessary, as is the case when ⊢-joints have to be employed as unions for the pipe and hose connections.

The accompanying drawing represents a horizontal section of a stand-pipe provided with a fire-hose connection held in place by the means contemplated in my invention, said hose connection being shown in plan partly broken away.

Referring by letter to the drawing, A represents a stand-pipe, and B a fire-hose connection having its inner end shaped to conform to the contour of the pipe and provided with lateral lugs *b*, that face corresponding lugs *c*, belonging to a clip C, that also conforms to the contour of said pipe. By means of bolts *d* and nuts *e* the opposing lugs of the fire-hose connection and clip are united and made fast to the pipe, an opening *f* having been previously cut in said pipe to communicate with said hose connection and a suitable gasket *g* is employed to pack the joint.

As is usual in that class of devices to which my invention relates, a positively-adjustable valve is employed to control the nozzle portion of the fire-hose connection herein shown.

The fire-hose connection herein shown is of that variety that comprises a casing having an integral divergent coupling-nozzle and an inlet-controlling valve longitudinally adjustable in said casing by means of a screw-stem. The casing also contains a seat for the valve, and therefore the latter closes within said casing instead of against the stand-pipe.

The valve-seat is obtained by reducing the bore of the casing at its inner end to thereby provide an annular interior shoulder against which the valve is brought to rest when the nozzle divergent from said casing is cut off.

From the foregoing it will be seen that I provide for clamping the fire-hose connections in place, and that no tapped openings in the stand-pipe are necessary, as is the case with such hose connections as are individually provided with a flange conforming to the outside of said pipe and held in place thereon by screw-bolts engaging said openings, this latter description of fire-hose connection having been also designed for the purpose of doing away with ⊢-joints previously employed as unions for pipe-sections and hose connections.

Having thus described my invention, what I claim as new, and desire to secure by Letters Patent, is—

A stand-pipe fire-hose connection comprising a casing shaped at its inner end to conform to the exterior of the pipe as well as to register with an opening in the same and provided with a divergent hose-coupling nozzle, an interior annular shoulder and exterior lateral lugs, a valve adjustable longitudinally of said casing to seat against said shoulder and thereby cut off said nozzle, a clip that also conforms to the exterior of said stand-pipe and is provided with lateral lugs facing those aforesaid, bolts engaging the casing and clip-lugs, and nuts run on the bolts.

In testimony that I claim the foregoing I have hereunto set my hand, at Milwaukee, in the county of Milwaukee and State of Wisconsin, in the presence of two witnesses.

AUGUST ENGEL.

Witnesses:
 N. E. OLIPHANT,
 HENRY DANKERT.